No. 899,555.

L. OWEN.
FAN.
APPLICATION FILED JAN. 13, 1908.

Patented Sept. 29, 1908.
2 SHEETS—SHEET 1.

Witnesses
E. W. Stuart
F. G. Chapman

Inventor
Lee Owen.
By C. A. Snow & Co.
Attorneys

L. OWEN.
FAN.
APPLICATION FILED JAN. 13, 1908.

899,555.

Patented Sept. 29, 1908.
2 SHEETS—SHEET 2.

Witnesses
E. F. Stewart
F. T. Chapman.

Inventor
Lee Owen.
By C. A. Snow & Co
Attorneys

UNITED STATES PATENT OFFICE.

LEE OWEN, OF BLOOMINGTON, ILLINOIS.

FAN.

No. 899,555.

Specification of Letters Patent.

Patented Sept. 29, 1908.

Application filed January 13, 1908. Serial No. 410,623.

*To all whom it may concern:*

Be it known that I, LEE OWEN, a citizen of the United States, residing at Bloomington, in the county of McLean and State of Illinois, have invented a new and useful Fan, of which the following is a specification.

This invention has reference to improvements in fans, and its object is to provide a fan particularly adapted for use in stables or other structures where power is available, and is used for other purposes than driving fans, which may be readily coupled up to the fan for the purpose of causing a circulation of air for cooling and ventilating purposes.

The invention comprises essentially a fan designed to rotate upon a vertical axis and consists in the construction of the fan whereby the same may be cheaply made and at the same time will run true even when the power is applied from a distant point by a belt, and wherein the friction is reduced to a minimum.

The invention will be best understood by a consideration of the following detail illustration taken in connection with the drawings forming a part of this specification, and in which—

Figure 1:
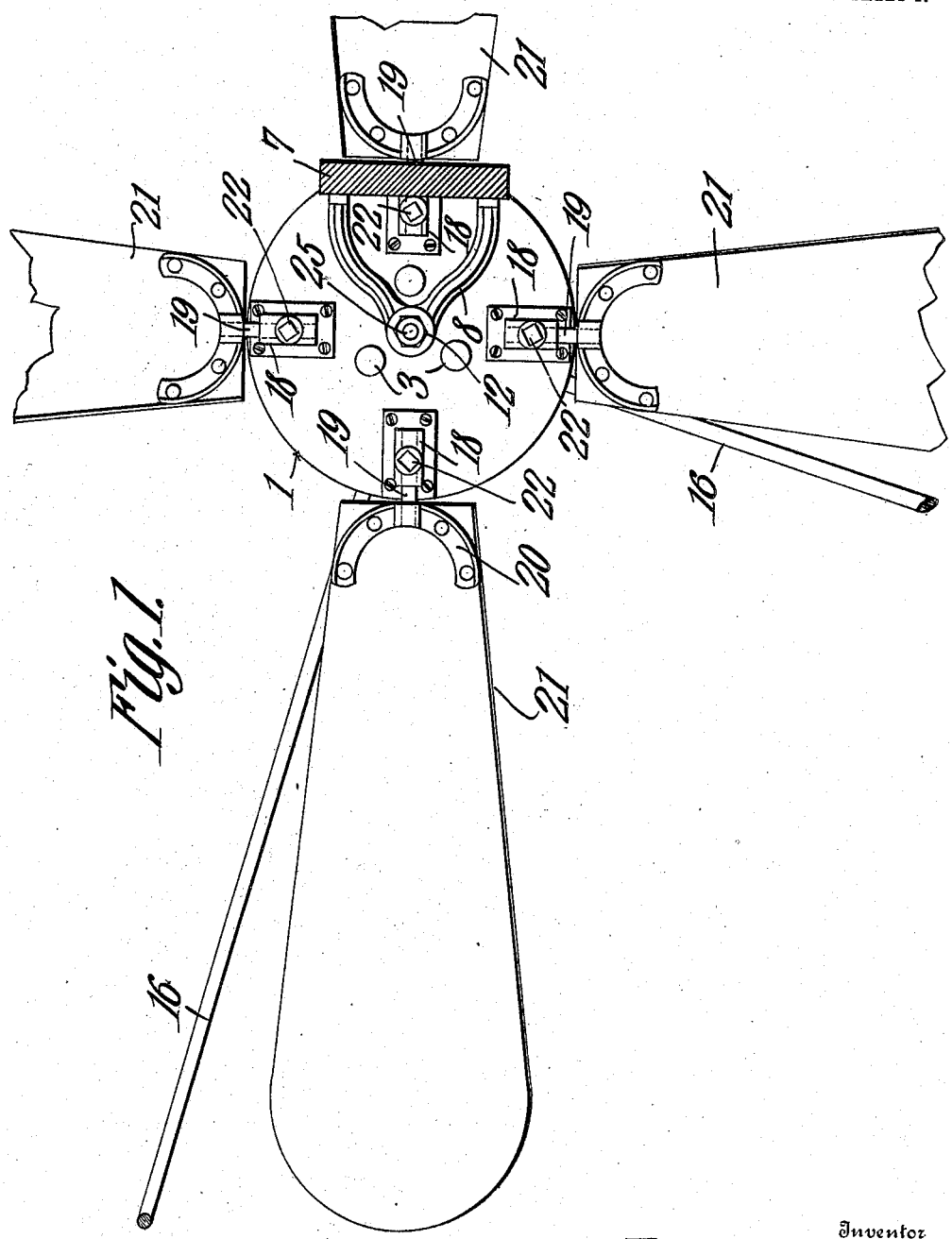
Figure 2:
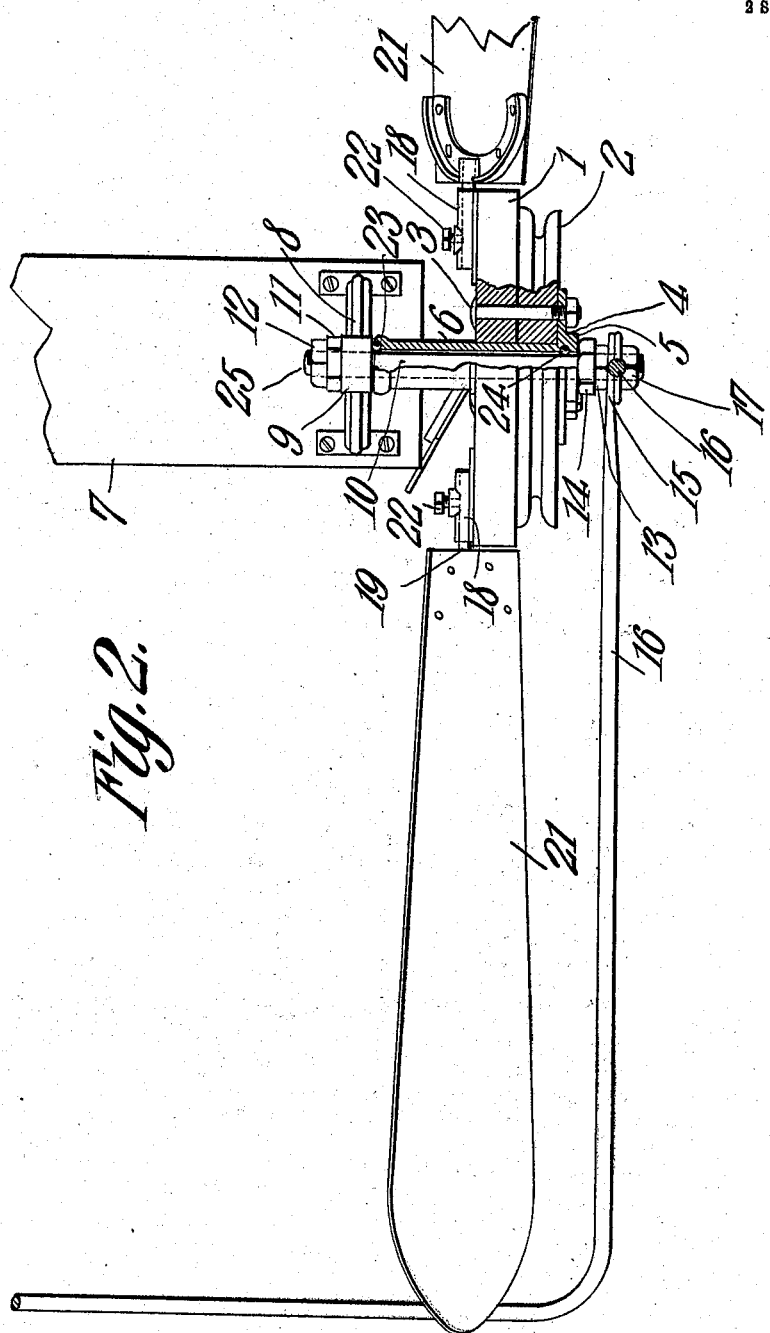

Figure 1 is a plan view of the improved fan, and Fig. 2 is a side elevation, partly in section, of the same.

Referring to the drawings, there is shown a hub 1, which may be in the form of a disk and is preferably made of wood or other cheap material. This hub has secured to one face a grooved pulley 2 by means of a number of equally spaced bolts 3, and these bolts also serve to secure to the pulley 2 an annular plate 4 formed on its inner edge with a laterally-extending flange 5. This plate may be formed of cast metal and has secured to it in the process of casting a steel sleeve 6 extending through the plate and to one side of the same for a sufficient distance for the purposes of the invention.

Extending downward from a suitable support, say the ceiling of the stable, is a timber 7 forming the main support for the fan. Fast on this timber is a bracket 8 extending laterally from the timber near its lower end and formed at the free end into an eye 9 through which is passed a bolt 10 being held to the bracket by a nut 11 and a lock nut 12. This bolt is of sufficient length to extend through the sleeve and beyond the lower end of the same, and there the bolt is threaded to receive a nut 13 and a lock nut 14.

Below the nut 13 the bolt receives the eyes 15 of two brace rods 16 which are held against the nut 13 by another nut 17. These brace rods may be arranged at any appropriate angle but are preferably arranged at right angles one to the other and are carried horizontally for a sufficient distance to escape the blades of the fan and are then upturned so as to be carried to the ceiling of the stable to be there secured. Fast upon the upper face of the disk 1 are equidistantly disposed brackets 18 each having a longitudinal passage for the reception of the stem 19 of another yoke-shaped bracket 20 fast on the end of a fan blade 21. Each bracket 18 is likewise provided with a set screw 22 by means of which the fan may be fastened in place after its inclination has been determined.

The sleeve 6 is formed at its upper end with a ball race for a series of anti-friction balls 23, and at its lower end with a ball race for the reception of another series of anti-friction balls 24. The upper ball race is so shaped that the balls not only engage the bolt 10 but also will, under working conditions, engage the under face of the eye 9. Under ordinary conditions of rest the lower end of the sleeve 6 bears upon the nut 14. If, now, power be applied to a suitable belt applied to the pulley 2, then the fan is rotated and the reaction of the air will lift the hub 1 until the balls 23 engage against the under face of the eye 9 and thus prevent further upward movement of the fan, but at the same time there is presented an anti-fraction bearing which prevents undue friction from being generated at the upper end of the sleeve 6 and the eye 9 which limits its upward movement.

In order to properly oil the bearings an oil passage 25 may be formed longitudinally through the bolt 10 and is then branched off to a point approximately at the balls 23, after which the oil will gravitate to the balls 24.

What is claimed is:—

1. A fan comprising a hub, fan blades thereon, connections between the fan blades and the hub about which the fan blades may be adjusted on a longitudinal axis, a pulley on the under side of the hub, a bearing plate on the underside of the pulley, fastening means for securing the bearing plate, the pulley and the hub together, a bearing sleeve cast on the bearing plate and extending through the pulley and hub, a spindle receiving the bearing sleeve, and fastening means on the spindle at each end of the sleeve to hold the latter on said spindle.

2. A fan comprising a hub, fan blades thereon, a pulley, a bearing plate on the under side of the pulley, bolts extending through the hub the pulley and the bearing plate and securing the parts together, a bearing sleeve cast with the bearing plate, and a vertical spindle supported at both ends and receiving the sleeve at an intermediate point.

3. A fan comprising a hub, fan blades fast thereon but adjustable on a longitudinal axis, a pulley, means for securing the pulley to the hub, an annular plate exterior to the pulley and secured to the hub by the same fastening means that secure the pulley to the hub, a sleeve passing through the pulley, hub and plate and formed with ball races near its ends, a vertical spindle receiving the sleeve between its ends, and means for supporting the spindle at both ends.

In testimony that I claim the foregoing as my own, I have hereto affixed my signature in the presence of two witnesses.

LEE OWEN.

Witnesses:
L. O. CHAPMAN,
WALTER L. PLATT.